US009401938B2

(12) United States Patent
Bakaev

(10) Patent No.: US 9,401,938 B2
(45) Date of Patent: Jul. 26, 2016

(54) EFFICIENTLY ACCESSING WEB CONFERENCES FROM A MOBILE DEVICE

(71) Applicant: Citrix Systems, Inc., Fort Lauderdale, FL (US)

(72) Inventor: Alexander Bakaev, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 230 days.

(21) Appl. No.: 14/013,719

(22) Filed: Aug. 29, 2013

(65) Prior Publication Data
US 2015/0067044 A1 Mar. 5, 2015

(51) Int. Cl.
G06F 15/16 (2006.01)
H04L 29/06 (2006.01)

(52) U.S. Cl.
CPC .......... H04L 65/403 (2013.01); H04L 65/1059 (2013.01); H04L 65/1069 (2013.01)

(58) Field of Classification Search
CPC . G06F 9/4443; H04L 65/403; H04L 65/4038; H04L 65/4046
USPC ........................................................ 709/204
See application file for complete search history.

(56) References Cited

U.S. PATENT DOCUMENTS 8,368,738 B2 2/2013 Schindler
8,416,935 B2 4/2013 Coleman et al.
2008/0031161 A1 2/2008 Osthus et al.
2008/0115196 A1* 5/2008 Michel et al. ..................... 726/4
2009/0044132 A1 2/2009 Combel et al.
2009/0157414 A1 6/2009 O'Sullivan et al.
2011/0033035 A1 2/2011 Turner
2011/0185288 A1* 7/2011 Gupta et al. ................... 715/752
2011/0228922 A1* 9/2011 Dhara et al. ............. 379/202.01
2011/0249073 A1* 10/2011 Cranfill et al. ............. 348/14.02
2011/0320981 A1* 12/2011 Shen et al. ..................... 715/834
2012/0230484 A1* 9/2012 Kannappan et al. ..... 379/202.01
2012/0275349 A1 11/2012 Boyer et al.
2013/0210400 A1* 8/2013 Rhee et al. ..................... 455/416
2014/0136949 A1* 5/2014 Wang ............................ 715/234
2014/0156404 A1* 6/2014 Aldereguia et al. ........ 705/14.55
2014/0173701 A1* 6/2014 Albouyeh et al. ................. 726/4
2014/0351958 A1* 11/2014 Sabulsky et al. ................ 726/30

OTHER PUBLICATIONS

International Search Report for International Application No. PCT/US14/47615, mailed from the International Searching Authority on Apr. 13, 2015, 9 pages.

* cited by examiner

Primary Examiner — Douglas Blair
(74) Attorney, Agent, or Firm — BainwoodHuang

(57) ABSTRACT

A technique for joining a web conference on a mobile device includes running a program on the mobile device that displays a list of web conference invitations for web conferences scheduled to be held at or near the current time, receiving a user selection of one of the listed web conference invitations, and initiating a web conference for the selected web conference invitation using a web conference client installed on the mobile device. The technique enables mobile users to join web conferences quickly and with few manual operations.

21 Claims, 6 Drawing Sheets

EFFICIENTLY ACCESSING WEB CONFERENCES FROM A MOBILE DEVICE

BACKGROUND

Web conferencing software allows users to share files, desktops, and other data while simultaneously conducting voice communications. A person wishing to host a web conference (the "host") operates web conferencing software to create and send conference invitations via email to intended meeting participants ("users"). The users' machines receive the invitations and place them in the users' electronic calendars. The invitations include the proposed date and time of the web conference, any desired details entered by the host, and a URL (Uniform Resource Locator) to be followed (e.g., clicked) to join the web conference. Each user may open the invitation in the user's calendar on the user's machine and follow the URL to join the web conference at or near the designated start time. Once a user is connected to the conference, the user may share his or her desktop with other conference participants and/or exchange files or other data. If the user's computer has a speaker and a microphone (or an audio headset), the user may speak with other conference participants through the established connection using VoIP (Voice Over Internet Protocol).

Web conferencing invitations also typically provide telephone numbers and access codes for computers that do not support audio communications and/or that have poor network connections. Conference participants still follow the URLs in the conference invitations to exchange data, but also dial in to the conferences using the provided telephone numbers. For example, a user places a telephone call to the telephone number listed on the invitation and responds to user prompts to enter the access code provided. The user will thus be connected to the conference for sharing data via the URL, but may also speak with other conference participants using the user's own telephone.

SUMMARY

Users of mobile devices may employ mobile web conferencing applications for smart phones, PDAs (Personal Data Assistants), tablet computers, personal readers, and other web-enabled mobile devices. A user of a mobile device may join a conference substantially as described above, e.g., by opening a conference invitation in a calendar of a mobile device and tapping (or otherwise selecting) a URL listed in the invitation to join the conference for both data and voice communication. If the user's mobile device has a slow network connection, the user may use a telephone, such as the device's own cellular telephone (if there is one), to establish voice communications with the conference.

Unfortunately, users of conventional mobile web conferencing software must conduct many steps to connect to web conferences. For example, a user desiring to connect to a web conference typically opens a calendar application on the mobile device, navigates to the current date and time, finds the web conference invitation, opens the invitation, and clicks the URL. If voice communication is to be conducted via telephone, the user may also need to dial the telephone number listed in the invitation, respond to voice prompts, and enter the access code. Although these steps do not typically require a great deal of time, they do require the user's careful attention. Users of mobile devices cannot always focus intently on their devices, however, e.g., when they are driving an automobile.

What is needed, therefore, is a more convenient, efficient, and safe way for a user of a mobile device to join a web conference.

In contrast with conventional web conferencing software, an improved technique for joining a web conference on a mobile device includes running a program on the mobile device that displays a list of web conference invitations for web conferences scheduled to be held at or near the current time, receiving a user selection of one of the listed web conference invitations, and initiating a web conference for the selected web conference invitation using a web conference client installed on the mobile device. In an example, the program on the mobile device is easily accessible from a home screen of the mobile device and may be implemented as a mobile app, a widget, a shortcut to an application, or some other readily accessible construct. In some examples, the act of the user selecting one of the listed web conference invitations causes the mobile device to join the conference without requiring further user input. In various examples, the web conference client is implemented as a mobile app, a browser plug-in, or some other client software construct capable of communicating over the Internet. The improved technique thus enables mobile users to join web conferences quickly and with fewer manual operations than are required using the conventional approach. Mobile users are thus able to join web conferences with only brief attention to their devices, with improvements achieved in both user convenience and safety.

Certain embodiments are directed to a method of joining web conferences on a mobile device. The method includes running a program on the mobile device to display a list of web conference invitations for web conferences scheduled to be held contemporaneously with a current time indicated by the mobile device. The method further includes receiving a user selection of a web conference invitation from the list of web conference invitations and initiating a web conference for the selected web conference invitation using a web conference client installed on the mobile device.

Other embodiments are directed to a mobile device and a computer program product. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for joining a web conference on a mobile device includes running a program on the mobile device that displays a list of web conference invitations for web conferences scheduled to be held at or near the current time, receiving a user selection of one of the listed web conference invitations, and initiating a web conference for the selected web conference invitation using a web conference client installed on the mobile device.

Figure 1:
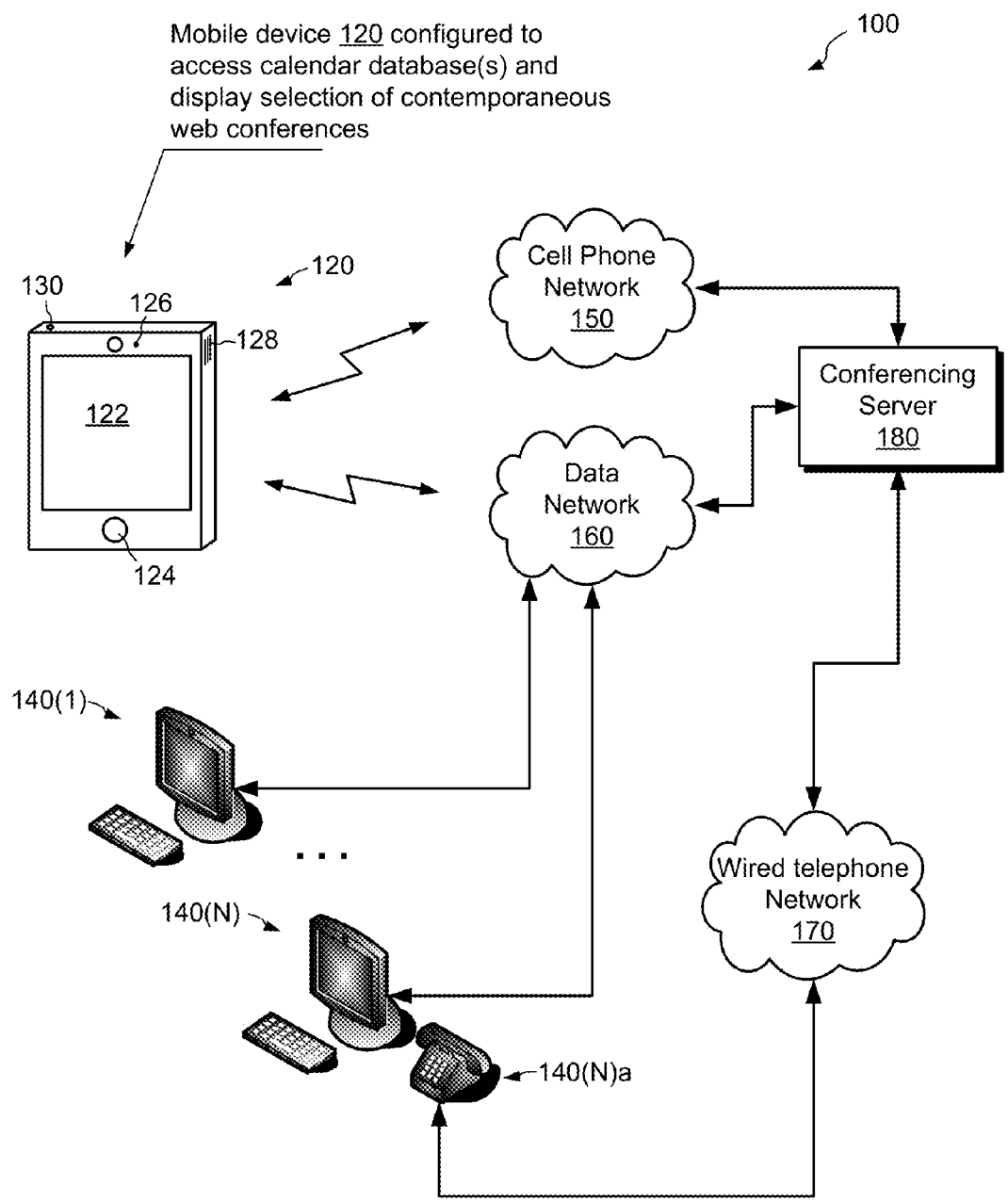
FIG. 1 is block diagram of an example environment in which embodiments of the invention hereof can be practiced.

FIG. 1 shows an example environment 100 in which embodiments of the improved technique hereof can be practiced. Here, a mobile device 120 is wirelessly coupled to a conferencing server 180 via a cell phone network 150 and a data network 160 for conducting a web conference. The cell phone network 150 may be used for conveying voice communications, whereas the data network 160 may be used for conveying data (e.g., files, text, screen captures, etc.). Alternatively, the mobile device 120 uses the data network 160 for exchanging voice communications (e.g., using VoIP), and no separate cell phone network 150 is required.

Other computing devices 140(1) to 140(N) are also coupled to the conferencing server 180 for participating in the web conference. For example, the computer 140(1) is coupled to the conferencing server 180 via the data network 160 for exchanging both data and voice (using VoIP). The computer 140(N) is coupled to the conferencing server 180 via the data network 160 for exchanging data, but uses a separate telephone 140(N)a and a wired telephone network 170 for communicating voice. The conferencing server 180 bridges together data and voice communications conveyed over the various networks to allow all conference participants to speak with one another and to exchange data.

It is understood that the arrangement of FIG. 1 is merely illustrative. For example, the telephone 140(N)a may itself be a VoIP-based telephone such that telephone signals are conveyed over the data network 160. Also, the mobile device 120 may use a single network for both cell phone and data, and other networks may be used besides those shown. Further, any number of other computing devices may participate in the web conference, including other mobile devices, and as few as two devices may participate in any given web conference. Thus, the environment 100 should be regarded merely as providing an example context in which the inventive concepts hereof may be practiced but should not be regarded as limiting those concepts.

The mobile device 120 is seen to include a touch screen 122, which serves both as a display and as an input device, a button 124, a microphone 126, a speaker 128, and an audio jack 130. During a web conference, a user of the mobile device 120 can speak into the microphone 126 and hear audio from others conveyed via the speaker 128. The user may alternatively use a headset (e.g., a microphone and ear buds) plugged into the audio jack 130 or may use an independently powered Bluetooth headset.

The mobile device 120 may be any type of mobile computing device, such as a smart phone, PDA (Personal Data Assistant), tablet computer, personal reader, or any other type of web-enabled mobile device. In a particular example, the mobile device 120 is a smart phone running the Android operating system. However, other smart phones may be used, such as the iPhone, Blackberry, Windows phone, or some other type of phone.

In operation, the mobile device 120 runs a program for initiating web conferences. The program accesses one or more calendars on or accessible by the mobile device 120 and identifies web conference invitations stored in the calendar(s) for web conferences scheduled to begin at or near the current date and time. The program displays any such identified conference invitations in a list on the touch screen 122. A user may read the list and select a particular web conference to join, e.g., by tapping on a displayed item in the list. In some examples, the user may double-tap on a displayed item to join the identified conference directly. The user may alternatively single-tap on a displayed item to obtain information about the web conference invitation without joining the conference.

The user may establish settings of the program to select calendars to include when searching for contemporaneous web conferences. The user may also establish a setting for using either VoIP or a cellular telephone (if the mobile device 120 has a cellular telephone) for conveying voice communications during web conferences.

In an example, the above-described program is implemented as a home screen widget. A home screen widget serves as a particularly convenient form in which to implement the program as it is readily accessible from the user's home screen and can run without occupying the entire display of the touch screen 122. It is not required that the program be implemented as a home screen widget, however. Alternatively, the program may be implemented as some other type of widget, as a mobile application (i.e., an "app"), a script, or as some other program construct.

Figure 2:
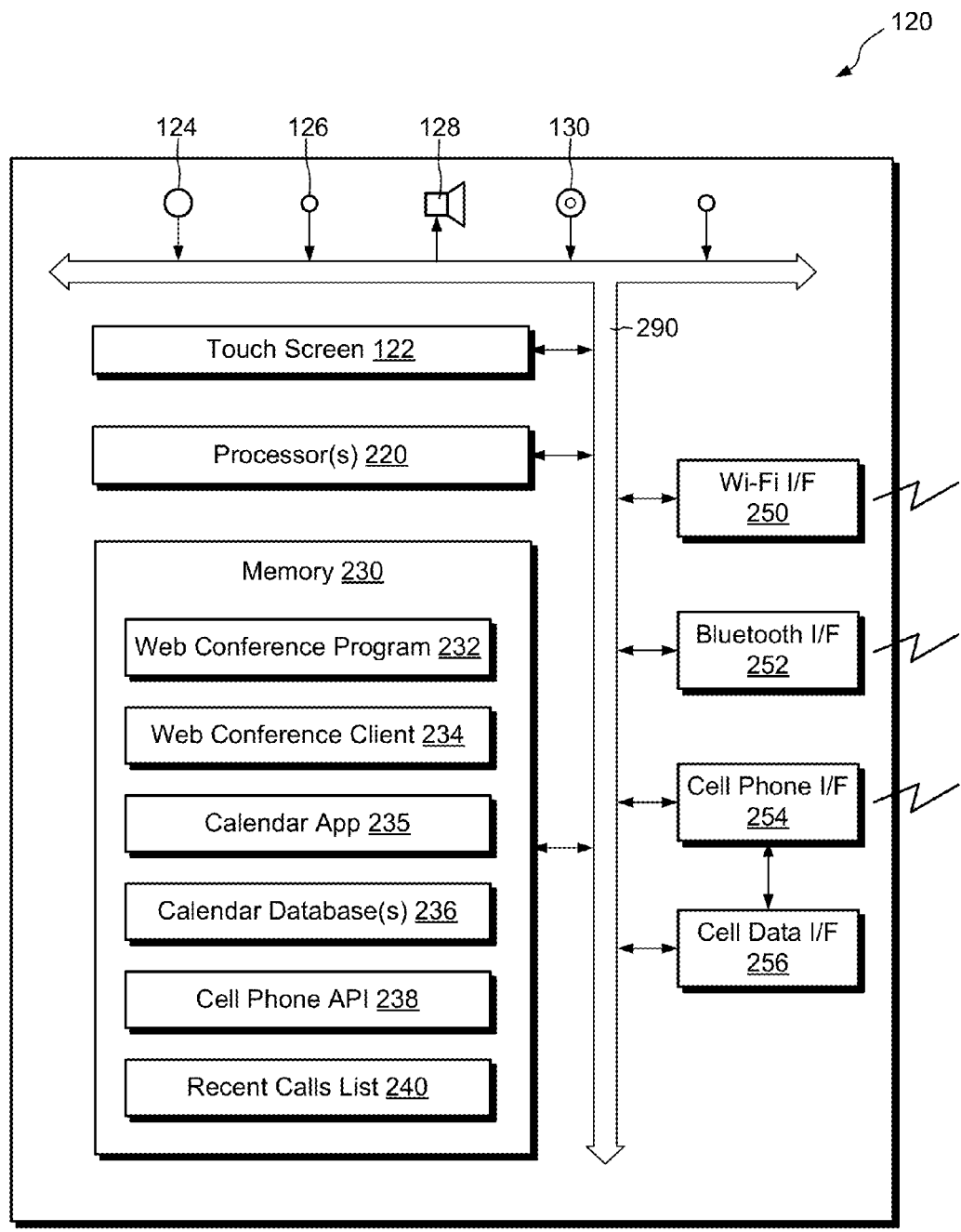
FIG. 2 is a block diagram of an example mobile device of FIG. 1.

FIG. 2 shows an example mobile device 120 in greater detail. In addition to the features already described, the mobile device 120 is seen to further include a set of processors 220 (i.e., one or more processing chips and/or assemblies) and memory 230. The memory 230 includes both volatile memory (e.g., RAM) and non-volatile memory, such as one or more disk drives, solid state drives and the like. The set of processors 220 and the memory 230 together form control circuitry, which is constructed and arranged to carry out various methods and functions as described herein. Also, the memory 230 includes a variety of software constructs realized in the form of executable instructions. When the executable instructions are run by the set of processors 220, the set of processors 220 are caused to carry out the operations of the software constructs.

The mobile device 120 is further seen to include various interfaces, such as a Wi-Fi interface 250, a Bluetooth interface 252, a cellular telephone interface 254, and a cellular data interface 256. A bus 290 interconnects the various components of the computerized apparatus 120 and provides a vehicle for communicating among such elements. In various examples, the bus 290 is implemented as a system bus or as multiple distinct busses, each serving a respective sub-system of the mobile device 120 and having interconnections to the others. It is understood that certain elements are omitted from FIG. 2 for simplicity, such as circuitry for interfacing analog components 124, 126, 128, and 130 to the bus 290, and that those skilled in the art could readily reproduce such missing elements.

The memory 230 includes various software constructs, such as a web conference program 232 (the aforementioned "program"), a web conference client 234, a calendar app 235, a set of calendar databases 236, a cell phone API (application programming interface) 238, and a recent calls list 240. Although certain software constructs are specifically shown and described, it is understood that the memory 230 typically includes many other software constructs, which are not shown, such as an operating system and various applications, processes, services, and the like.

In an example, the web conference client 234 is a mobile app for joining and conducting web conferences, such as the GoToMeeting mobile app available from Citrix Systems, Inc. of Santa Clara, Calif. Alternatively, the web conference client 234 is a plug-in or add-on that works in conjunction with a web browser (not shown) running on the mobile device 120. The web conference client 234 may be operated in the conventional manner, i.e., by joining web conferences in response to the user selecting a web conference invitations from the user's calendar. In the embodiments disclosed herein, however, the web conference client 234 also operates to join conferences in response to the user selecting web conference invitations from lists of web conference invitations displayed by the web conference program 232.

The web conference program 232 communicates with the set of calendar databases 236 to generate the list of contemporaneous web conferences. In some variants, the set of calendar databases 236 include multiple distinct databases, such as one calendar database for the user's Gmail account, another calendar database for the user's POP server (e.g., work calendar), and other calendar databases for other user calendars. In other variants, the set of calendar databases 236 combine calendar entries for any number of user calendars together in a single calendar database. The calendar database, or databases, may be implemented, for example, in one or more Java HashMap containers. The calendar database(s) 236 may be stored in the memory 230 (as shown), may be stored outside the mobile device 120 (e.g., on a remote server to which the mobile device 120 connects), or in the form of some combination of local and remote calendar databases.

In an example, the set of calendar databases 236 store calendar events in the form of database records. To generate the list of contemporaneous web conferences, the web conference program 232 queries the set of calendar databases 236 to identify any calendar events scheduled to be conducted within a specified time range proximate to the current time that include a URL (Uniform Resource Locator) having a predetermined text pattern indicative of a web conference link. In a particular example, the web conference program 232 specifies a query to identify web conference events scheduled to begin in a time range extending from two hours prior to the current time to eight hours after the current time. The web conference program 232 may identify web conference invitations as calendar events that include a predetermined text pattern, such as "www3.gotomeeting.com/join." The web conference program 232 then displays on the touch screen 122 calendar events that satisfy the query, e.g., in ascending order based on start time.

The web conference program 232 may also communicate with the cell phone API 238. For example, the web conference program 232 may identify a telephone number in a web conference invitation and direct the cell phone API 238 to dial the identified telephone number to join a web conference. The web conference program 232 may further direct the cell phone API 238 to detect multiple states of the cellular telephone on the mobile device 120 and to enter an access code for a web conference (as specified in the web conference invitation) in response to the cellular telephone assuming a connected state. The web conference program 232 may also communicate with the cell phone API 238when the user manually selects a telephone number displayed on the recent calls list 240. In this situation, the cell phone API is configured to alert the web conference program 232 that a telephone number from the recent calls list 240 has been selected. The web conference program 232 checks whether the selected telephone number is associated with a contemporaneous web conference invitation. If so, the web conference program 232 takes actions to rejoin the associated web conference, e.g., by directing the cell phone API to dial the selected number, enter the access code for the associated web conference once a connected cell phone state is detected, and follow the URL for the associated web conference to reestablish data communication.

Figure 3:
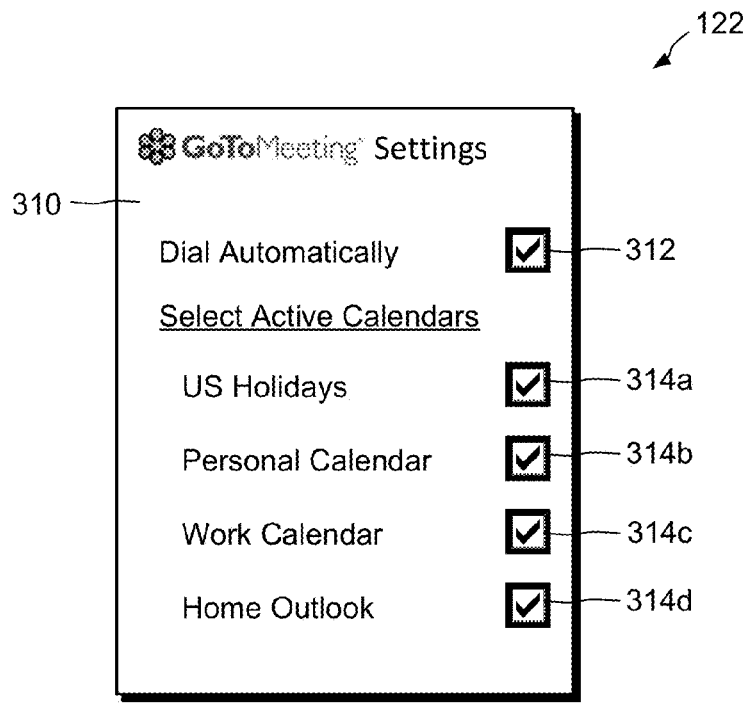
FIG. 3 is an example screenshot displayed by a program on the mobile device of FIG. 2 for establishing settings of the program.

FIG. 3 shows an example screenshot of a settings display 310 of the web conference program 232, as displayed on the touch screen 122. Here, the web conference program 232 takes the form of a home screen widget and a user may invoke the settings display 310 in the usual manner, i.e., by long-tapping a title bar of the widget. The settings display 310 includes a checkbox 312 to "Dial Automatically." If the user checks this box, the web conference program 232 directs the web conference client 234 to use the cellular telephone of the mobile device 120 for conducting voice communications during web conferences. If the user leaves the box 312 unchecked, the web conference program 232 directs the web conference client 234 to use VoIP during web conferences.

The settings display 310 also includes checkboxes 314*a* to 314*d* for selecting calendars to be included when querying the calendar databases 236. In an example, the mobile device 120 is configured to access multiple calendars (e.g., US Holidays, Personal Calendar, Work Calendar, Home Outlook, etc.). The user may check the checkboxes 314*a*-*d* corresponding to the calendars to include the respective calendars in queries that the web conference program 232 runs to generate the lists of contemporaneous web conferences or may leave certain of the calendars unchecked to exclude them. The particular calendars displayed on the settings display 310 reflect the calendars configured on the mobile device 120 and thus tend to vary from device to device, with different calendars displayed, and a greater or fewer number of calendars displayed (and checkboxes provided) based on the configuration of the particular device.

In an example, the mobile device 120 supports multiple instances of the web conference program 232. For example, the mobile device 120 can display multiple home screen widgets, each widget running as a different instance of the web conference program 232. The different instances may be provided with different settings. Thus, one instance of the web conference program 232 may include all calendars configured on the mobile device 120 whereas another instance may include fewer calendars (e.g., only the "Work Calendar"). Providing multiple instances of the web conference program 232 allows users to easily segregate web conferences pertaining to different contexts (e.g., one for personal use and another for work use). The settings for each instance of the web conference program 232 are preferably persistent on a per-instance basis, meaning that, once they are established for any particular instance, the settings remain in place for that instance until the user changes them.

Figure 4:
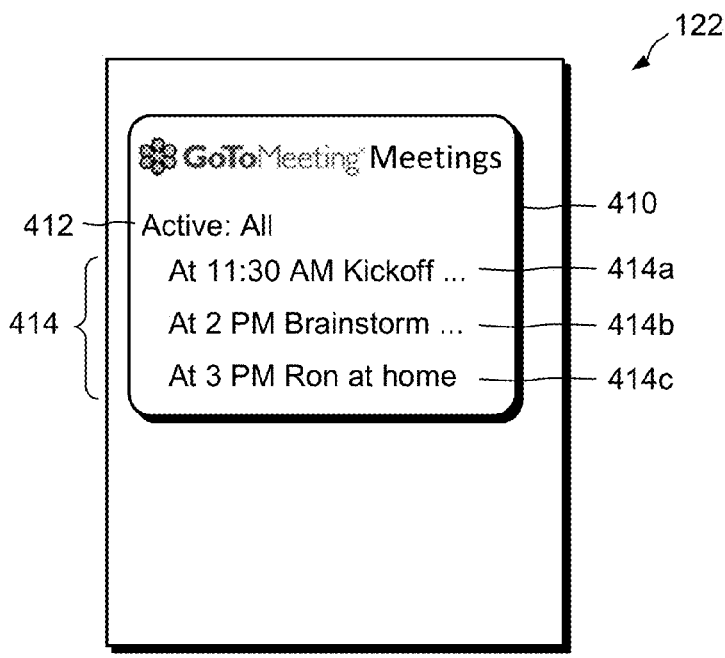
FIG. 4 is another example screenshot displayed by the program on the mobile device of FIG. 2 for showing a list of contemporaneous web conference invitations.

FIG. 4 shows an example display 410 of the web conference program 232 on the home screen of the mobile device 120. Here, it is seen that the display 410 occupies only a portion of the home screen, i.e., it does not occupy the entire screen. If the user has configured multiple instances of the web conference program 232, the mobile device 120 may show a different display like the display 410 for each instance of the web conference program 232.

The display 410 includes an element 412 showing the active calendars, i.e., the calendars selected for the current instance of the web conference program 232 in the settings display 310. In this case, all calendars have been selected. If fewer than all calendars have been selected, the element 412 may list the selected calendars individually.

The display 410 also includes a list 414 of contemporaneous web conferences, i.e., the list of web conference invitations obtained by querying the selected calendars for web conference invitations scheduled to occur near the current time. Here, three invitations have been found, listed as list items 414a through 414c. Each of the list items 414a-c presents text which describes the respective invitation. For example, the text displayed for each invitation reflects the start time of the web conference and a topic or subject (or portion thereof) that the host provided when creating the invitation. Each of the list items 414a-c is an active element, which, when tapped by the user, causes an action to be taken. For example, when the user single-taps one of the list items 414a-c, the web conference program 232 causes detailed information pertaining to the corresponding invitation to be displayed. When the user double-taps one of the list items 414a-c, the mobile device 120 directly initiates the web conference identified by the invitation. In an example, the web conference program 232 renders the list items 414a-c in a form that is similar to the form in which the calendar app 235 on the mobile device 120 renders web conference events, such that double tapping a list item has the same effect as double-tapping an invitation in the calendar app 235. The mobile device 120 internally associates web conference invitations with the web conference client 234 (e.g., when the web conference client 234 is installed on the mobile device 120 or during a disambiguation step) and dispatches any double-tapped invitation (regardless of whether it appears on the list 414 or in the calendar app 235) to the web conferencing client 234. The web conference client 234 automatically starts the web conference, i.e., by following a URL in the invitation. If the checkbox 312 ("Dial Automatically") has been selected, the web conference client 234 uses the cell phone of the mobile device 120 for conveying audio during the web conference. Otherwise, the web conference client 234 uses VoIP.

In an example, the web conference program 232 updates the list 414 of contemporaneous web conferences, e.g., by querying the set of calendars on a regular basis, such as once per minute, to ensure that the display 410 remains current. In some examples, the web conference program 232 changes the color of a displayed list item (one of 414a-c) to alert the user that the conference is about to begin or has recently begun. For example, the web conference program 232 may turn a list item green for a period of time starting 10 minutes before the conference is scheduled to begin and ending 30 minutes later. The web conference program 232 may use other cues, such as turning a list item red to indicate that the user is late for a scheduled conference, by causing the item to flash, or by making an audible sound when a conference is schedule to begin, for example.

Figure 5:
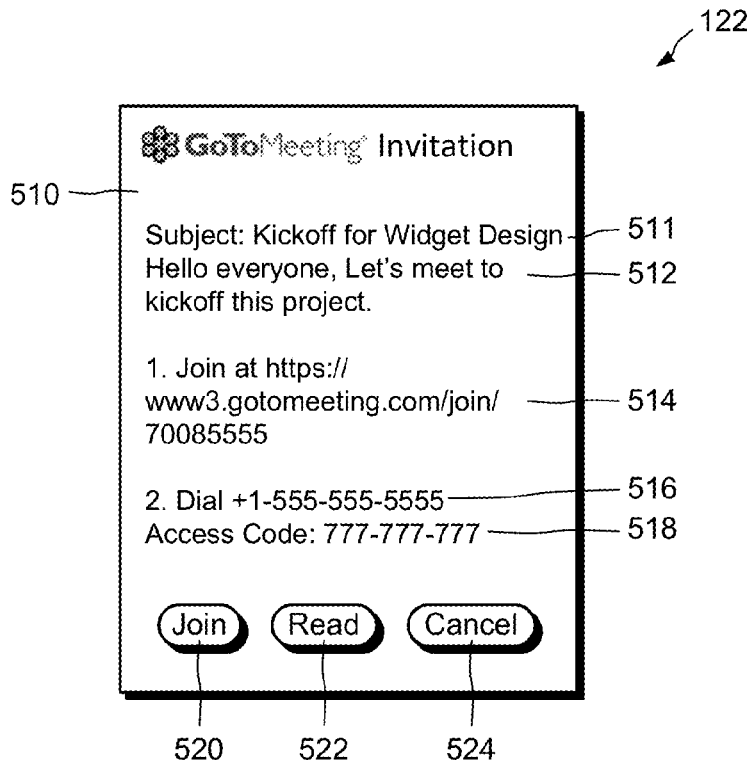
FIG. 5 is another example screenshot displayed by the program on the mobile device of FIG. 2 showing details of a particular web conference invitation.

FIG. 5 shows an example display 510, which the mobile device 120 outputs in response to the user performing a single-tap operation on a selected list item (one of 414a-c). Here, the mobile device 120 displays the web conference invitation corresponding to the selected list item to allow the user to review the invitation prior to joining the conference. The display 510 is seen to include a subject 511 ("Kickoff for Widget Design") and a message 512, which the host entered when creating the conference invitation. The display 510 also includes a URL 514 to be followed for establishing data communication, as well as for establishing voice communication if VoIP is used (based on the state of the checkbox 312). The screen shot 510 further displays a dial-in number 516 and an access code 518, which are to be entered when establishing voice communication using the mobile device's cell phone.

The user may tap a "Join" button 520 on the display 510 to join the displayed conference. If the checkbox 312 is set, the mobile device 120 follows the URL 514 to establish data communication and invokes the cell phone API 238 to dial the call-in number 516, detect various phone states, and enter the access code 518 once a connected state is established. If the checkbox 312 is unchecked, the mobile device 120 follows the URL 514 to establish both data communication and voice communication, with voice communication handled through VoIP.

Prior to joining the conference, the user may tap a "Read" button 522 on the display 510 to invoke a text-to speech operation and allow the user to hear the invitation details (or some subset thereof) played through the speaker 128 (or through a headset). The user can then decide whether to join the conference based on what the user hears. The text-to-speech option thus allows the user to make a decision about whether to join a conference without having to visually read the invitation and suffer distraction when driving or engaging in some other activity where reading text visually is inconvenient or unsafe.

The user may also tap a "Cancel" button 524 to close the invitation. For example, if the user decides that the user does not wish to join the conference, the user may cancel out and return to a previous screen (typically, the home screen).

In one example, the web conference program 232 is the software construct that displays the screen shot 510 and performs actions in response to the buttons 520, 522, and 524. For example, the web conference program 232 obtains the web conference invitation from a corresponding calendar entry and displays the invitation's contents. When the user taps the "Join" button 520, the web conference program 232 launches the invitation, which the mobile device 120 dispatches to the web conference client 234, substantially as described above in connection with the double-tap operation performed on one of the list items 414a-c. When the user taps the "Read" button 522, the web conference program 232 submits the text of the invitation (or a portion thereof) to a text-to-speech service running on the mobile device 120, which then performs the text-to-speech operation. Also, when the user taps the "Cancel" button 524, the web conference program 232 closes the screen 510 and allows focus to return to the preceding screen.

In another example, the calendar app 235 running on the mobile device 120 displays the screen shot 510. For example, in response to the user single-tapping one of the list items 414a-c, the web conference program 232 opens the corresponding web conference invitation in the calendar app 235. The user may then read the invitation and join the conference in the usual manner, i.e., by tapping the URL 514. It should be noted that the buttons 520, 522, and 524 may not be available if the calendar app 235 is used to display the invitation, i.e., the buttons will be displayed according to this example only if the calendar app 235 supports the buttons 520, 522, and 524 when displaying web conference invitations.

Figure 6:
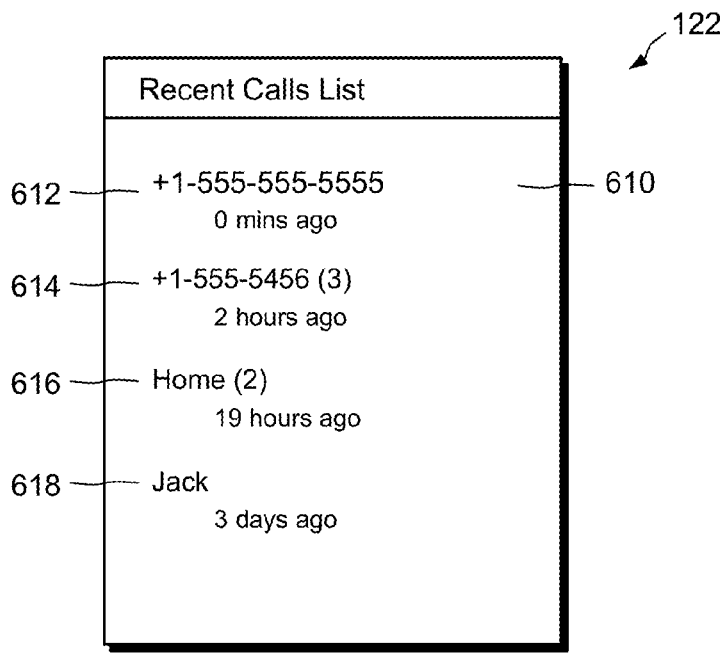
FIG. 6 is yet another example screenshot displayed on the mobile device of FIG. 2 showing a recent calls list.

FIG. 6 shows an example screen shot 610 of a recent calls list 240 as displayed on the touch screen 122 of the mobile device 120. Here, the screen shot 610 shows various recent telephone calls 612, 614, 616, and 618 listed in order of recentness.

It has been observed that mobile devices 120 can drop cell phone calls when users enter areas with no cell phone reception. For example, a user who joined a web conference with the invitation displayed in FIG. 5 using the device's cell phone might lose the call after driving into a tunnel. Rather than rejoining the conference in the usual way, or even by selecting an item from the list 414, the user can instead select the dropped call, shown here as call 612, from the recent calls list 240. In response to selecting the call 612, the web conference program 232 detects that a telephone number has been selected from the recent calls list 240 and tests whether the telephone number has recently been used in connection with a web conference. If it has, the web conference program 232 acts to reestablish a voice audio connection by directing the cell phone API 238 to dial the selected telephone number and enter the access code for the web conference when a connected state is detected. If the connection to the conferencing server 180 via the URL 514 has also been dropped, the web conference program 232 may follow the URL 514 to reestablish the connection. Thus, the user may reconnect to the conference through the simple act of selecting the telephone number 516/612 from the recent calls list 240. This process is made even simpler by the fact that the mobile device 120 may automatically display the recent calls list 240 whenever a call is dropped. Thus, no screen navigation may be required, and the user may simply select the dropped call from the already-displayed screen to rejoin the conference.

The web conference program 232 may use a variety of techniques to test whether a selected call from the recent calls list 240 has recently been used in connection with a web conference. According to one such technique, when the web conference program 232 queries the set of calendars to generate the list 414, the web conference program 232 also builds a data structure that includes, for each web conference invitation returned from the query, the subject 511, the message 512, the URL 514, the dial-in number 516, and the access code 518 (alternatively, only a subset of these items are stored). The web conference program 232 updates the data structure each time a query is performed to reflect current contemporaneous web conference invitations. Thus, old invitations drop out of the data structure and new ones are added, in the same manner as old invitations drop off and are added to the list 414 over time. When the web conference program 232 detects that the user has selected a call from the recent calls list 240, the web conference program 232 searches the data structure for the selected telephone number. If the number is found, the web conference program 232 performs the above actions of directing the cell phone API 238 to dial the telephone number, enter the access code in the data structure associated with the telephone number, and resubmit the URL associated with the telephone number if the connection to the conferencing server 180 has been dropped. If the number is not found in the data structure, the number is redialed but no further action is taken to rejoin a conference, as the data structure does not associate any conference with the selected telephone number.

Figure 7:
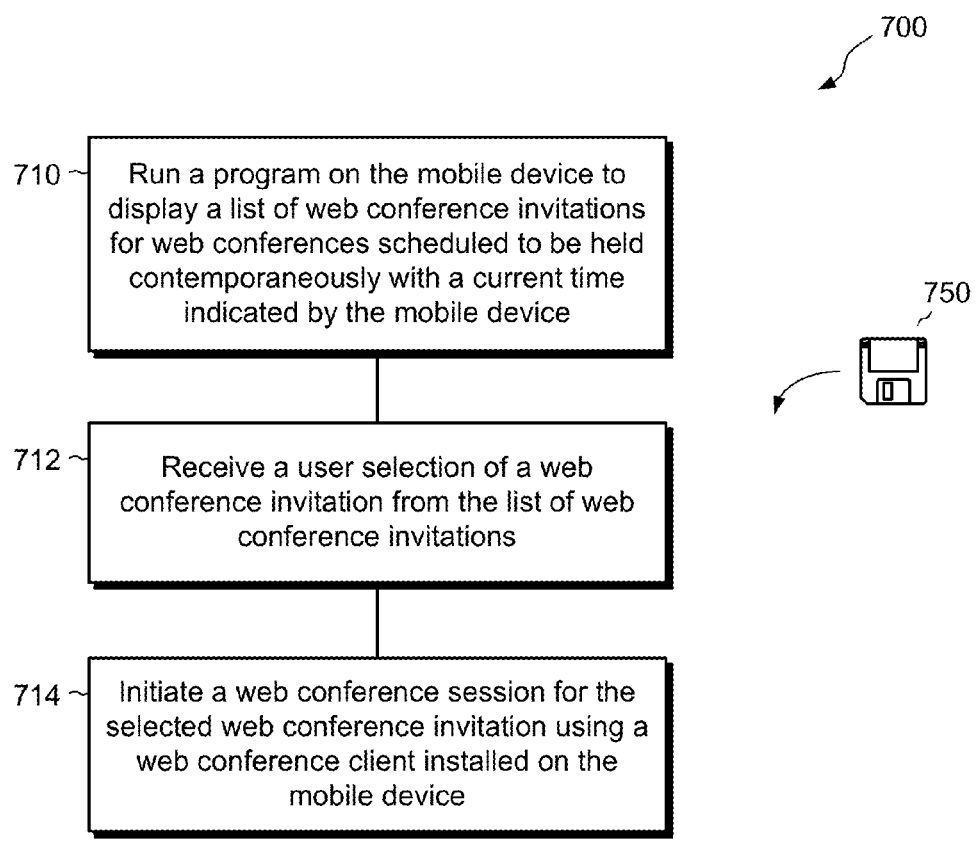
FIG. 7 is a flowchart showing an example process for conducting a web conference using the mobile device of FIG. 2.
Figure 8:
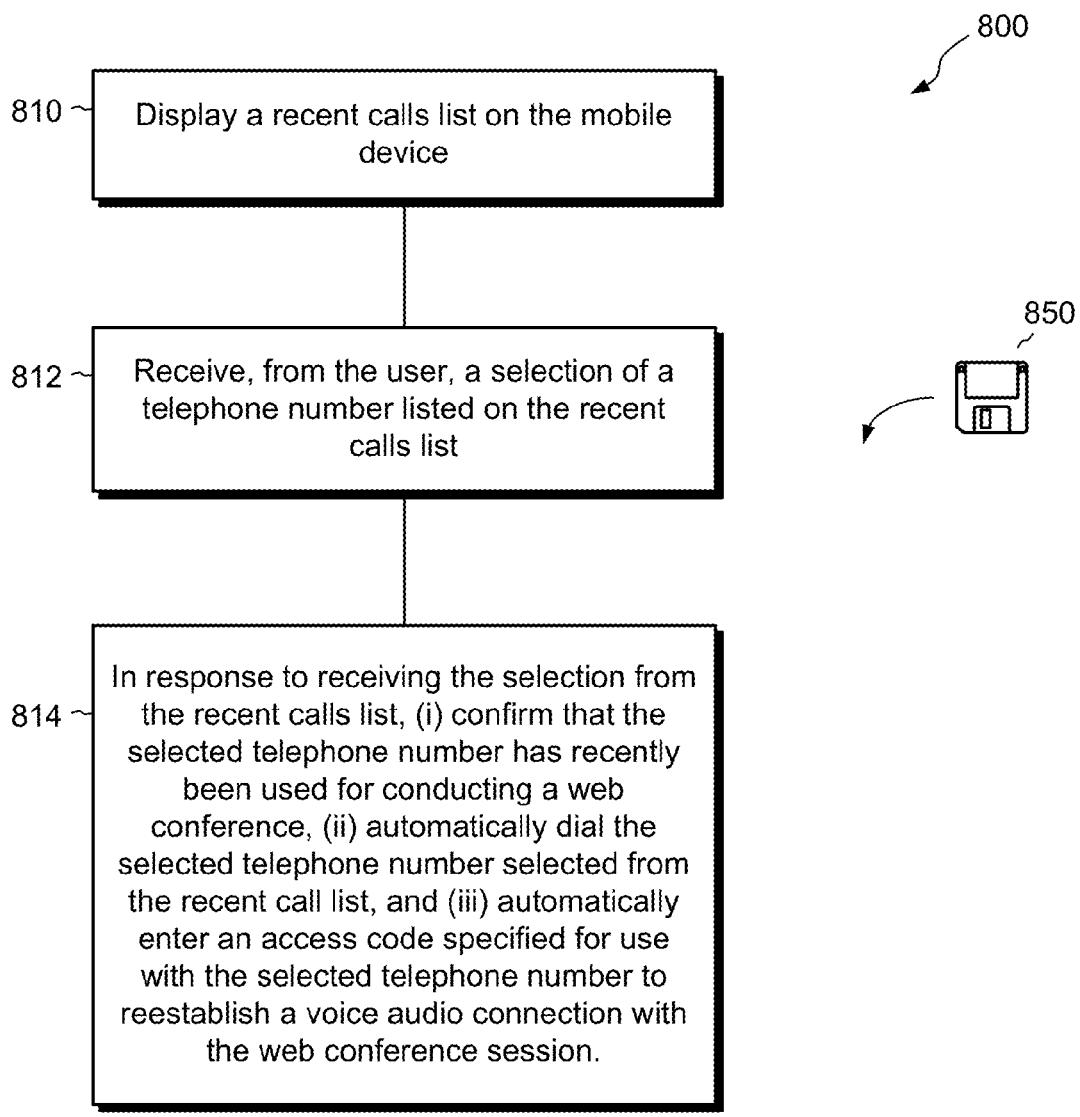
FIG. 8 is a flowchart showing an example process for rejoining a web conference using the mobile device of FIG. 2 after a cell phone connection to the web conference has been dropped.

FIGS. 7 and 8 show processes 700 and 800 that may be carried out in connection with the computing environment 100. These processes are typically performed by the software constructs, described in connection with FIG. 2, which reside in the memory 230 of the mobile device 120 and are run by the set of processors 220. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 7 shows an example process 700 for joining web conferences on a mobile device. At step 710, a program is run on the mobile device to display a list of web conference invitations for web conferences scheduled to be held contemporaneously with the current time indicated by the mobile device. For example, the web conference program 232 running on the mobile device 120 queries the set of calendar databases 236 to obtain a list 414 of web conference invitations (414a-c) scheduled to begin around the current time, such as between two hours prior to the current time and eight hours after the current time. The web conference program 232 displays the list 414, as shown, for example, in the screen shot 410.

At step 712, a user selection is received of a web conference invitation from the list of web conference invitations. For example, the user taps on one of the web conference invitations 414a-c and the web conference program 232 receives the user selection.

At step 714, a web conference is initiated for the selected web conference invitation using a web conference client installed on the mobile device. For example, in response to the user double-tapping one of the web conference invitations displayed on the list 414, the mobile device 120 directs the web conference client 234 to join the web conference specified in the selected invitation, i.e., by following the URL 514 and, if the cell phone is used, dialing the call-in number 516 and entering the access code 518. In response to the user single-tapping one of the web conference invitations displayed on the list 414, the web conference program 232, working independently or through the calendar app 235, opens the invitation for viewing (as shown in FIG. 5) and allows the user to review the invitation before tapping a "Join" button 520. In response to the user tapping the button 520, the web conference client 234 operates to join the conference specified in the displayed invitation.

FIG. 8 shows and example process 800 for rejoining a web conference after a cell phone call that carries audio for the web conference has been dropped.

At step 810, a recent calls list is displayed on the mobile device. For example, after a cell phone call carrying audio for a web conference is dropped, the mobile device 120 displays the recent calls list 240, as shown in FIG. 6.

At step 812, a selection of a telephone number listed on the recent calls list is received from the user. For example, the user taps on a telephone number in the recent calls list 240, and the mobile device 120 receives the user action.

At step 814, in response to receiving the selection from the recent calls list, a number of acts are performed, including (i) confirming that the selected telephone number has recently been used for conducting a web conference, (ii) automatically dialing the selected telephone number selected from the recent call list, and (iii) automatically entering an access code specified for use with the selected telephone number to reestablish a voice audio connection with the web conference. In an example, the mobile device 120 performs these acts and may perform additional acts, as well, including following the URL 514 to reestablish data communication with the web conference. In confirming that the selected telephone number has recently been used for conducting a web conference, the web conference program 232 may search the above-described data structure for the selected telephone number. If the selected telephone number is found, the web conference program 232 retrieves the corresponding access code 518 and, optionally, the URL 514, which the mobile device employs along with the selected telephone number in rejoining the conference.

An improved technique has been described for joining a web conference on a mobile device. The technique includes running a program 232 on the mobile device 120 that displays a list 414 of web conference invitations for web conferences scheduled to be held at or near the current time, receiving a user selection of one of the listed web conference invitations, and initiating a web conference for the selected web conference invitation using a web conference client 234 installed on the mobile device 120. The improved technique enables mobile users to join web conferences quickly and with fewer manual operations than are required using the conventional approach. Mobile users are thus able to join web conferences with only brief attention to their devices, with improvements achieved in both user convenience and safety.

Having described certain embodiments, numerous alternative embodiments or variations can be made. For example, the web conference program 232 has been described for listing contemporaneous web conference invitations and directing the web conference client 234 to initiate a web conference in response to a user selecting one of the listed invitations. More generally, however, the web conference program 232 can be regarded as a dispatch program for querying calendar entries for contemporaneous events, listing the events, and receiving a selection of an event for further processing. Thus, although the implementation hereof is for selecting web conference invitations, other embodiments may be constructed for selecting other calendar events.

Also, although web conferences are shown and described as exchanging both data and voice, it is understood that web conferences can be conducted in which only data is exchanged (e.g., via file sharing, screen sharing, etc.) or in which only voice is exchanged (e.g., via VoIP or cell phone). Thus, the invention hereof does not require that web conferences exchange both data and voice. Further, web conferences may also exchange video, e.g. for conducting face-to-face video chat during the course of a web conference. Although the embodiments hereof do not require video, neither do they exclude video, which may be used in web conferences consistently with the teachings hereof.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 750 and 850 in FIGS. 7 and 8). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments. Those skilled in the art will therefore understand that various changes in form and detail may be made to the embodiments disclosed herein without departing from the scope of the invention.

What is claimed is:

1. A method, performed by a mobile device, for joining web conferences, comprising:
running a program on the mobile device to display a list of web conference invitations for web conferences scheduled to be held contemporaneously with a current time indicated by the mobile device;
receiving a user selection of a web conference invitation from the list of web conference invitations; and
initiating a web conference for the selected web conference invitation using a web conference client installed on the mobile device,
wherein the method further comprises the program on the mobile device querying a set of calendar databases to obtain the list of web conference invitations, wherein querying the set of calendar databases includes identifying any calendar events in the set of calendar databases (i) scheduled to be conducted within a specified time range proximate to the current time and (ii) that include a URL (Uniform Resource Locator) having a text pattern that matches a predetermined text pattern indicative of a web conference link.

2. The method of claim 1, wherein the set of calendar databases store calendar events obtained from multiple calendars, and wherein the program on the mobile device includes one or more user settings for selecting which calendars available on the mobile device are to be included in the multiple calendars.

3. The method of claim 2, further comprising running a second instance of the program on the mobile device to display a second list of web conference invitations scheduled to be held contemporaneously with the current time indicated by the mobile device, the second instance of the program on the mobile device obtaining a second set of web conference invitations from a second set of calendars that include at least one calendar that is not included in the multiple calendars.

4. The method of claim 1, further comprising repeating the act of querying the set of calendar databases to refresh the list of web conference invitations as the current time indicated by the mobile device changes.

5. The method of claim 1, further comprising the program on the mobile device displaying the selected web conference invitation to allow a user to read the selected web conference invitation prior to initiating the web conference.

6. The method of claim 5, wherein displaying the selected web conference invitation is performed when the user selection includes a single-tap operation on the selected web conference invitation displayed on the list of web conference invitations.

7. The method of claim 5, further comprising the program on the mobile device accepting a user command to perform a text-to-speech operation to output spoken text of the web conference invitation through the mobile device.

8. The method of claim 5, further comprising the program on the mobile device accepting a user command to join the web conference described in the displayed web conference invitation.

9. The method of claim 1, wherein initiating the web conference for the selected web conference invitation is performed directly in response to the user selection when the user selection includes a double-tap operation on the selected web conference invitation displayed on the list of web conference invitations.

10. The method of claim 1, further comprising the program on the mobile device identifying a URL designating a web conference within the selected web conference invitation, wherein initiating the web conference includes following the URL to establish a data connection with the designated web conference by the web conference client.

11. The method of claim 10, further comprising the program on the mobile device identifying a telephone number within the selected web conference invitation, wherein initiating the web conference further includes the program on the mobile device directing the mobile device automatically to dial the identified telephone number using its cellular telephone to establish a voice audio connection with the designated web conference.

12. The method of claim 11, further comprising the program on the mobile device identifying an access code for the designated web conference within the selected web conference invitation, wherein initiating the web conference further includes the program on the mobile device (i) detecting multiple states of the cellular telephone on the mobile device and (ii) directing the mobile device automatically to enter the access code in response to the cellular telephone assuming a connected state of the multiple states.

13. The method of claim 12, wherein the program on the mobile device includes a persistent setting to allow the user to select whether to direct the web conference client to use the mobile device's cellular telephone or VOIP for voice communication during web conferences.

14. The method of claim 13, further comprising, after a connection between the mobile device and the designated web conference is dropped:
displaying a recent calls list on the mobile device;
receiving, from the user, a selection of a telephone number listed on the recent calls list;
in response to receiving the selection from the recent calls list, (i) confirming that the selected telephone number has recently been used for conducting a web conference, (ii) automatically dialing the selected telephone number selected from the recent call list, and (iii) automatically entering an access code specified for use with the selected telephone number to reestablish a voice audio connection with the web conference.

15. The method of claim 14, further comprising, in response to querying the set of calendar databases:
building a data structure, the data structure associating, for each web conference invitation returned when querying the set of calendar databases, a URL specified in the respective web conference invitation, a telephone number specified in the respective web conference invitation, and an access code specified in the respective web conference invitation,
wherein confirming that the selected telephone number has recently been used for conducting a web conference includes searching the data structure to determine whether the selected telephone number is present in the data structure.

16. The method of claim 1, wherein the program on the mobile device is implemented as home screen widget and the web conference client is implemented as a smartphone app.

17. A mobile device, comprising:
a touch screen;
a set of processors coupled to the touch screen; and
memory, coupled to the set of processors, the memory storing executable instructions, which when executed by the set of processors cause the set of processors perform a method of joining web conferences, the method comprising:
running a program on the mobile device to display on the touch screen a list of web conference invitations for web conferences scheduled to be held contemporaneously with a current time indicated by the mobile device;
receiving a user selection of a web conference invitation from the list of web conference invitations; and
initiating a web conference for the selected web conference invitation using a web conference client installed on the mobile device,
wherein the method further comprises the program on the mobile device querying a set of calendar databases to obtain the list of web conference invitations, wherein querying the set of calendar databases includes identifying any calendar events in the set of calendar databases (i) scheduled to be conducted within a specified time range proximate to the current time and (ii) that include a URL (Uniform Resource Locator) having a text pattern that matches a predetermined text pattern indicative of a web conference link.

18. A non-transitory computer readable medium including instructions which, when executed by a set of processors of a mobile device, cause the set of processors to perform a method of joining web conferences on a mobile device, the method comprising:
running a program on the mobile device to display a list of web conference invitations for web conferences scheduled to be held contemporaneously with a current time indicated by the mobile device;
receiving a user selection of a web conference invitation from the list of web conference invitations; and
initiating a web conference for the selected web conference invitation using a web conference client installed on the mobile device,
wherein, in response to the web conference on the mobile device being dropped:
displaying a recent calls list on the mobile device;
receiving, from the user, a selection of a telephone number listed on the recent calls list;
in response to receiving the selection from the recent calls list, confirming that the selected telephone number has recently been used for conducting a web conference and, in response to confirming (i) automatically dialing the selected telephone number, and (ii) automatically entering an access code specified for the web conference to reestablish a voice audio connection with the web conference.

19. The non-transitory computer readable medium of claim 18, wherein the method further comprises:
querying a set of calendar databases to obtain the list of web conference invitations;
building a data structure, the data structure associating, for each web conference invitation returned when querying the set of calendar databases, a URL specified in the respective web conference invitation, a telephone number specified in the respective web conference invitation, and an access code specified in the respective web conference invitation,
wherein confirming that the selected telephone number has recently been used for conducting a web conference includes searching the data structure to determine whether the selected telephone number is present in the data structure.

20. The non-transitory computer readable medium of claim 19, wherein the method further comprises:
   repeating the act of querying the set of calendar databases; and
   updating the data structure in response to a repeated act of querying,
   wherein updating the data structure includes adding a newer web conference invitation to the data structure and removing an older web conference invitation from the data structure.

21. The non-transitory computer readable medium of claim 18, wherein initiating the web conference for the selected web conference invitation is performed directly in response to the user selection when the user selection includes a double-tap operation on the selected web conference invitation displayed on the list of web conference invitations.

* * * * *